John H. Fleet
INVENTOR.

BY Thomas O. Arnold

ATTORNEY

MEANS FOR OBSERVING BOREHOLES

Filed Sept. 12, 1955 2 Sheets-Sheet 2

John H. Fleet
INVENTOR.

BY Thomas O Arnold

ATTORNEY

United States Patent Office 2,849,530 Patented Aug. 26, 1958

2,849,530

MEANS FOR OBSERVING BOREHOLES

John H. Fleet, Taft, Tex.

Application September 12, 1955, Serial No. 533,605

1 Claim. (Cl. 178—7.2)

This invention relates to observation of remote locations in boreholes in the earth such as oil wells.

There are many situations that arise in the drilling and producing of an oil well which demand that the operator be able to observe the inside surface of casing or tubing, the nature and position of things in the borehole and the size or extent of caverns adjoining the borehole. Unfortunately, it has never been possible to "observe" these things, except through relatively unsatisfactory feeling in the dark with fishing tools or variations in mud pressures, and the like, and the logical reasoning from the limited facts thus obtained.

An object of this invention is to provide means for and method of visually observing remote locations in boreholes in the earth such as oil wells.

Other objects are apparent from the following description and accompanying drawings.

These objects are accomplished in accordance with this invention by the use of separate video camera and monitor units, the camera being mounted and otherwise adapted for being run along with a light source into a borehole which has been flushed with clear liquid such as water.

Figure 1:
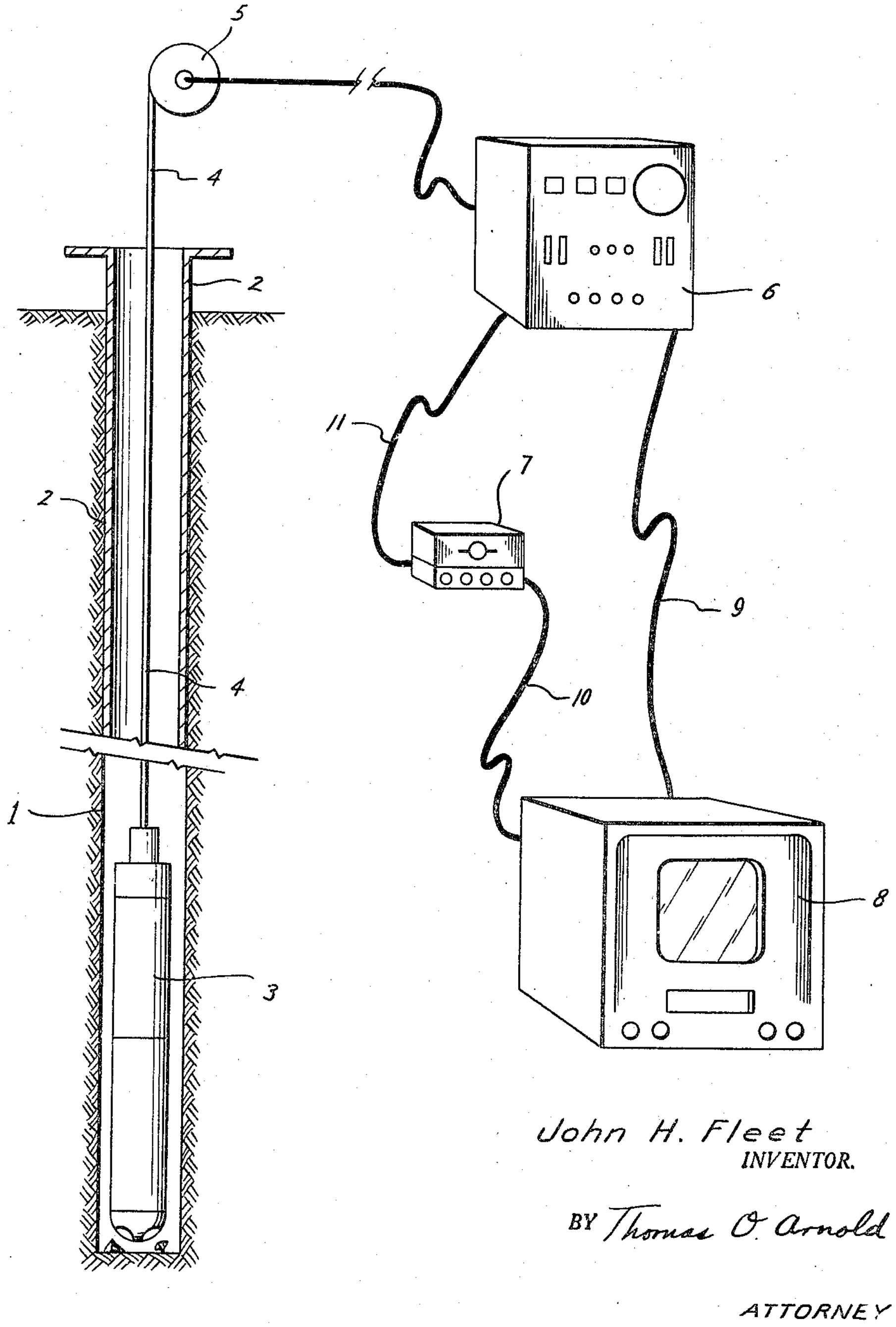
Figure 1 is a schematic representation of the apparatus used in the invention.

In Figure 1, there is illustrated a borehole 1 in the earth. The upper end of the borehole 1 is lined with surface casing 2. In the borehole 1 there is a camera unit 3, hanging from a wire line and video and power cable 4. The wire line and video cable 4 pass over a pulley 5 at the surface of the ground. On the surface of the ground, there is a power supply unit 6, a video control unit 7 and a monitor unit 8. The video cable 4 is connected to the power supply unit 7. The monitor or viewing unit 8 derives its power through a line 9 between it and the power supply unit 6. The video control unit 7 is connected by a line 10 to the monitor unit, and by a line 11 to the power supply unit.

The camera unit is housed in a housing 14 adapted to be suspended from a wire line 4. The numeral 4 in the drawings designates the wire line for physical support of the housing 14, and also a video cable and other lines to fulfill the needs and purposes of the equipment in the housing. For example, lines to supply power for the light source hereafter described may be included in the cable 4, in those embodiments of the invention which do not use batteries in the housing 14 for such purposes.

In the embodiment illustrated the cable 4 includes lines supplying power to each of two electric motors 15 and 16, more fully described below, lines to supply power to the camera and video amplifier and light source, and lines to carry the video signal back to the surface of the ground.

Within the housing 14, there is a video camera 18, preferably aimed straight toward the normally lower end of the housing 14. The camera 18 may use a tube such as the RCA 6198 vidicon. Appropriate sweep and focusing coils and the like are included in the camera 18. The camera 18 is supplied with power through a line 19 which is one of the lines in the cable 4. The image picked up by the camera 18 is transmitted by a line 20 to a video amplifier 21 and by a line 22 to the cable 4 and to the surface. The video amplifier may be powered by the line 19.

For efficient operation of the unit in its various locations in an oil well, it is necessary to shield the camera magnetically. For some applications, the construction of the housing 14 out of magnetic material suffices. But in other applications, it is preferable to surround the camera 18 with a single layer, close wound coil, through which there may be passed several mils of direct current, thereby setting up a stabilized field in which the camera operates.

The sweep pulses used in the camera are preferably generated in the surface equipment. When the camera is used in remote locations, the pulses tend to lose their shape due to the difference in attenuation of different frequencies between the surface and the camera. Accordingly, the pulses generated at the surface must be such as to include compensations for this varying attenuation, as will be understood by those skilled in the art.

Positioned in the normally lower end of the housing 14, there is a light source. The light source may take the form of a bright mercury lamp 22, such as a General Electric A–H6 water cooled lamp. The well fluids must have free access to the lamp. Preferably, there is some space 23 left around the lamp 22 to permit convection currents of the well fluids therearound, to facilitate the cooling of the lamp. The lamp 22 is connected by wiring (not shown) to the cable 4 as the source of power.

Appropriate means for directing and focusing light reflected from the observation area are provided. Since the light source occupies, in small models of the instrument, so much of the lower end of the tool, in such models it is preferred to receive the light through a path at one side of the lower end, and then to direct the light to the camera 18. As appears in Figure 2, there is a transparent cover 28 over the lower end of the light path to the camera 18. A first prism 30 (or other reflecting means) reflects the light at right angles to a second prism 31 which reflects the light vertically upward directly into the pickup end of the camera 18.

Figures 2, 3, 4:
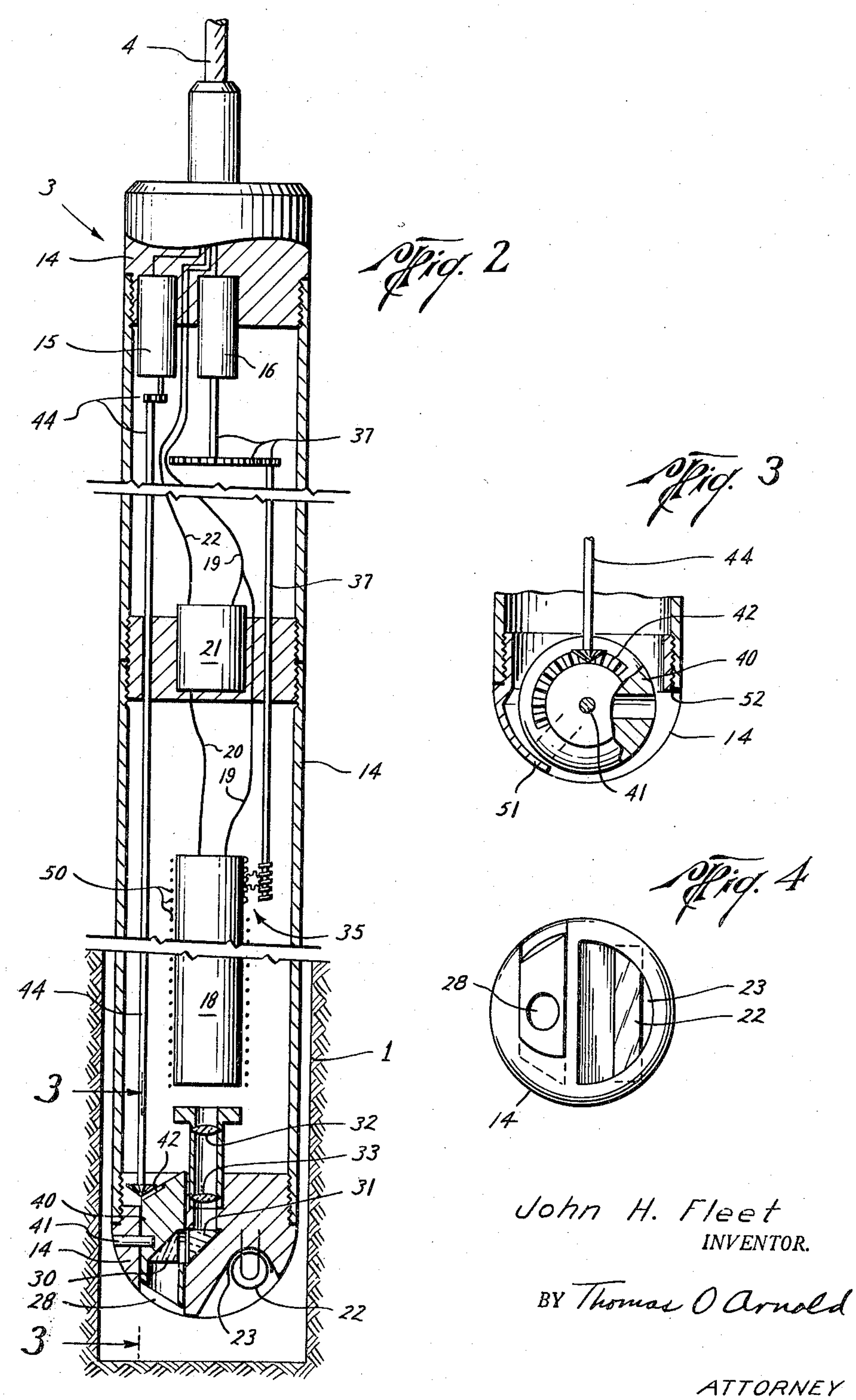
Figure 2 is a detail of the housing for the camera unit.
Figure 3 is a sectional detail illustrating a means for rotating the pickup mirror.
Figure 4 is a view from the lower end of the camera housing unit illustrating the relative positions of the "eye" and of the light source in one embodiment of the invention.

A pair of lenses 32 and 33 are positioned between the second prism 31 and the camera 18 to focus the light. Variations in the focal length can be accomplished by relative movement between the camera 18 and the lenses 32 and 33. In the embodiment of Figure 2, this relative movement is provided for by mounting the camera for vertical reciprocal motion, and by appropriate gearing 35 adapted to move the camera closer to or farther from the lenses 32 and 33. The gearing 35 is powered through a shaft and gear train 37 from an electric motor 16. The motor 16 receives its power through the cable 4.

Preferably, means are provided for moving the line of sight of the camera. This may be done by mounting the first prism 30 in a rotatable block 40. A pin 41 secures the block 40 to the body 14 and is the axis of rotation of the block 40. Preferably, the reflecting surface of the prism 30 is centered in the axis of rotation of the block 40.

Gear teeth 42 are cut in one edge of the block 40. A shaft and gear train 44 transmits power from the electric motor 15 effective for controlled rotation through an arc of about 115°, of the block 40.

The apparatus described has utility in many earth boreholes, including oil wells being drilled by cable tool and compressed air methods and having no liquids in them to speak of, and oil wells being drilled by rotary drilling methods which are full of drilling mud and the like. Heretofore, no one has given serious consideration to optical observation of wells full of mud for the reason of the mud's being dirty and opaque.

In accordance with this invention, however, a slug of fresh, clear water, or other clear liquid which is substantially unmiscible with the particular drilling mud or liquid in the well is circulated into the well. By calculating the volume of liquid between the surface of the well and the particular position at which inspection is desired, and pumping either more mud or more clear liquid of substantially that volume down the well after the original slug of clear liquid, the slug of clear liquid may be located at the position to be inspected. If the clear liquid is sufficiently unmiscible with the particular drilling mud (as clear water is with respect to some muds), then the liquid can be kept sufficiently clear for optical observation through several inches of liquid.

After the clear liquid is positioned, video apparatus hereinabove described is placed in use, the camera unit being run down in the borehole to the inspection position. During this running operation, the block 40 is rotated, carrying with it the prism 30 and transparent cover 28, to the position illustrated by the dotted lines in Figure 3, so that the transparent cover 28 is moved to a protected position behind the lip 51 (Figure 3). Conveniently, there may be wipers secured at the edges of the lips 51 and 52 to wipe the transparent cover 28 each time it is rotated behind such lips.

Modification may be made in the invention as herein particularly described without departure from the scope of the invention. Accordingly, the foregoing description is to be construed as illustrative only and is not to be construed as a limitation upon the invention as defined in the following claim.

I claim:

For use in observing boreholes, the combination of an elongated housing having normally upper and lower ends and adapted to be run in a borehole; a video camera positioned in said housing; a coil of wire surrounding said camera and adapted to have direct current passed therethrough whereby said camera may be surrounded by a stabilized magnetic field; said housing having a window therein through which light may pass from said borehole; first reflection means adapted to reflect light entering said window at right angles; means for rotating said first reflection means about an axis parallel with the line of light reflected by said first reflection means; a second reflection means adapted to reflect light received from said first reflection means to the pickup end of said video camera; focusing means secured to said housing between said second reflecting means and said camera; means for varying the distance between said focusing means and said camera; a light source positioned in the normally lower end of said housing and adapted to illuminate the bore hole in the area around the window; means for supplying appropriate pulsed signals and power said camera and said light source for the operation thereof; means for transmitting the signal derived from said video camera to the surface of the ground for observation.

References Cited in the file of this patent

UNITED STATES PATENTS

| | | |
|---|---|---|
| 2,214,729 | Hickok | Sept. 17, 1940 |
| 2,387,608 | Paumier | Oct. 23, 1940 |
| 2,283,429 | Ennis | May 19, 1942 |
| 2,632,801 | Donaldson | Mar. 24, 1953 |
| 2,677,996 | Laval | May 11, 1954 |

OTHER REFERENCES

Electronic Engineering, September 1948, page 294.